United States Patent
Yoon et al.

(10) Patent No.: US 9,879,984 B2
(45) Date of Patent: Jan. 30, 2018

(54) OPTICAL SCANNING PROBE AND APPARATUS FOR GENERATING THREE-DIMENSIONAL DATA USING THE SAME

(71) Applicant: SAMSUNG ELECTRONICS CO., LTD., Suwon-si (KR)

(72) Inventors: Suk June Yoon, Seoul (KR); Kyung Shik Roh, Seongnam-si (KR); No San Kwak, Suwon-si (KR); Shin Kim, Hwaseong-si (KR); Ji Min Kim, Seoul (KR); Soon Yong Park, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 14/839,159

(22) Filed: Aug. 28, 2015

(65) Prior Publication Data

US 2016/0195386 A1     Jul. 7, 2016

(30) Foreign Application Priority Data

Jan. 2, 2015   (KR) .................. 10-2015-0000153

(51) Int. Cl.
*G01B 11/24*     (2006.01)
*G01B 11/25*     (2006.01)
(Continued)

(52) U.S. Cl.
CPC ........ *G01B 11/2518* (2013.01); *G01B 11/002* (2013.01); *G01B 11/22* (2013.01);
(Continued)

(58) Field of Classification Search
CPC ... G01B 11/002; G01B 11/22; G01B 11/2518; G01S 17/89; G01S 7/4817; G01S 17/42; G01S 7/4876; G01Q 60/22; G02B 26/10
(Continued)

(56) References Cited

U.S. PATENT DOCUMENTS 5,216,236 A     6/1993  Blais
5,448,360 A *   9/1995  Wakai ................. G01B 11/026
                                                  250/201.7
(Continued)

FOREIGN PATENT DOCUMENTS

DE   10 2010 0005 993      7/2011
JP         2009-198382     9/2009
(Continued)

OTHER PUBLICATIONS

Extended European Search Report dated May 12, 2016 in European Patent Application No. 15 186 041.8.

*Primary Examiner* — Tri T Ton
(74) *Attorney, Agent, or Firm* — Staas & Halsey LLP

(57) ABSTRACT

An optical scanning probe and an apparatus to generate three-dimensional (3D) data using the same are provided. The apparatus to generate 3D data includes an optical scanning probe that scans light generated from a light emitter over an object to be measured, a distance calculation processor that calculates a distance between the optical scanning probe and the object to be measured, based on the light scanned over the object to be measured and light reflected from the object to be measured; and a depth image generation processor that generates 3D data based on a scanning direction of the optical scanning probe and the distance between the optical scanning probe and the object to be measured.

6 Claims, 14 Drawing Sheets

(51) Int. Cl.
*G01S 17/42* (2006.01)
*G01S 17/89* (2006.01)
*G01S 7/481* (2006.01)
*G01B 11/00* (2006.01)
*G01B 11/22* (2006.01)

(52) U.S. Cl.
CPC ............ *G01S 7/4817* (2013.01); *G01S 17/42* (2013.01); *G01S 17/89* (2013.01)

(58) Field of Classification Search
USPC .................................................. 356/601–640
See application file for complete search history.

(56) References Cited

U.S. PATENT DOCUMENTS

| | | | |
|---|---|---|---|
| 5,557,397 | A | 9/1996 | Hyde et al. |
| 6,323,942 | B1 | 11/2001 | Bamji |
| 8,666,697 | B2 * | 3/2014 | Kaneda ................. G01S 7/4811 356/614 |
| 2002/0139920 | A1 | 10/2002 | Seibel et al. |
| 2002/0176098 | A1 * | 11/2002 | Neily ................. G01B 11/0625 356/630 |
| 2010/0290698 | A1 | 11/2010 | Freedman et al. |
| 2011/0006943 | A1 | 1/2011 | Shaffer |

FOREIGN PATENT DOCUMENTS

| | | |
|---|---|---|
| KR | 10-2006-0135566 | 12/2006 |
| KR | 10-2014-0012586 | 2/2014 |
| KR | 10-2014-0075974 | 6/2014 |
| WO | 2014/203138 | 12/2014 |

* cited by examiner

Spiral

Ellipse

OPTICAL SCANNING PROBE AND APPARATUS FOR GENERATING THREE-DIMENSIONAL DATA USING THE SAME

CROSS-REFERENCE TO RELATED APPLICATIONS

This application is related to, and claims the priority benefit of Korean Patent Application No. 10-2015-0000153, filed on Jan. 2, 2015 in the Korean Intellectual Property Office, the disclosure of which is incorporated herein by reference.

BACKGROUND

1. Field

Embodiments of the present invention relate to an optical scanning probe and an apparatus for generating three-dimensional (3D) data using the same.

2. Description of the Related Art

Robot cleaning devices are devices that remove foreign substances, such as dust, from the floor by traveling an area to be cleaned, for example, without a user's manipulation and perform a cleaning operation while traveling, for example, according to predetermined traveling patterns.

These robot cleaning devices may require three-dimensional (3D) image data so as to detect an environment including an object to be cleaned, for example, located ahead in a traveling path of the robot cleaning device and, for example, an obstacle to be avoided.

In addition to the 3D image data, a depth image may be generated, for example, by applying a 3D sensor in various fields, for example, including a television (TV).

A method of measuring a 3D depth of a front view from a change in patterns by scanning infrared patterns over an object to be measured to generate generating 3D image data has been applied. However, this method may require a minimum distance at which the patterns scanned over the front are viewed, and it may be difficult to perform depth measurement of an oblique surface.

A method of measuring a depth once by radiating infrared rays into all regions to generate 3D image data has been applied. In the method, since infrared rays may be required to be radiated into all regions using limited infrared (IR) power, there may be a problem in an amount of noise that is generated.

SUMMARY

It is an aspect of the present invention to provide an optical scanning probe for generating three-dimensional (3D) data by scanning a space in a state in which a light emitter is fixed and, for example, only an optical path is changed, and an apparatus for generating 3D data using the optical scanning probe.

Additional aspects of the invention are set forth in part in the description which follows and, in part, are obvious from the description, or may be learned by practice of the invention.

In accordance with an aspect of the present invention, an apparatus for generating three-dimensional (3D) data, includes an optical scanning probe that scans light generated from a light emitter over an object to be measured, a distance calculation processor that calculates a distance between the optical scanning probe and the object to be measured, based on the light scanned over the object to be measured and light reflected from the object to be measured; and a depth image generation processor that generates 3D data based on a scanning direction of the optical scanning probe and the distance between the optical scanning probe and the object to be measured.

The optical scanning probe may include an optical scanner that scans the light generated from the light emitter over the object to be measured, and a scanner processor that changes an optical path of the optical scanner and changes and controls a scanning type according to a shape of the object to be measured.

The scanning type may include one selected from the group consisting of a spiral type, an elliptical type, a horizontal type, a vertical type, a zigzag type, and a combination thereof.

The optical scanner may include an optical probe through which the light generated from the light emitter passes, and an optical lens that refracts the light that passes through the optical probe.

The optical scanner may have a type of a piezo tube actuator that controls the optical probe by driving a piezoelectric device.

The optical scanner may be a two-dimensional (2D) micro electro mechanical system (MEMS) mirror scanner which reflects the light generated from the light emitter.

The scanner processor may change a path of the light generated from the light emitter by adjusting an angle of reflection of the 2D MEMS mirror scanner.

The optical scanning probe may include a collimating lens that is disposed between the light emitter and the optical scanner, refracts the light generated from the light emitter at a predetermined angle and allows the refracted light to be incident on the optical scanner.

The distance calculation processor may include a light emitter that generates light to be scanned over the object to be measured and transmits the light to the optical scanning probe; an emission-side light receiving part that is located adjacent to the light emitter and receives the light generated from the light emitter, a reflection-side light receiving part that receives light reflected from the object to be measured, and a distance calculation controller that calculates a distance between the optical scanning probe and the object to be measured by calculating a time difference between the light received by the emission-side light receiving part and the light received by the reflection-side light receiving part.

The depth image generation processor may generate 3D data by restoring 3D coordinates based on information on a direction in which the light scanned over the object to be measured is transmitted from the optical scanning probe and the distance between the optical scanning probe and the object to be measured transmitted from the distance calculation processor.

The depth image generation processor may generate the 3D data by performing 3D coordinate restoration on each of a plurality of pixels.

The depth image generation processor may remove noise from the 3D data using a predetermined method.

The light emitter may be a laser diode or an infrared (IR) light emitting diode (LED).

In accordance with an aspect of the present invention, an optical scanning probe includes: an optical scanner that scans light generated from a light emitter over an object to be measured; and a scanner processor that changes an optical path of the optical scanner and changes and controls a scanning type according to a shape of the object to be measured.

The scanning type may include one selected from the group consisting of a spiral type, an elliptical type, a horizontal type, a vertical type, a zigzag type, and a combination thereof.

The optical scanner may include an optical probe through which the light generated from the light emitter passes; and an optical lens that refracts the light that passes through the optical probe.

The optical scanner may have a type of a piezo tube actuator that controls the optical probe by driving a piezoelectric device.

The optical scanner may be a two-dimensional (2D) micro electro mechanical system (MEMS) mirror scanner that reflects the light generated from the light emitter.

The scanner processor may change a path of the light generated from the light emitter by adjusting an angle of reflection of the 2D MEMS mirror scanner.

The optical scanning probe may include a collimating lens that is disposed between the light emitter and the optical scanner, refracts the light generated from the light emitter at a predetermined angle and allows the refracted light to be incident on the optical scanner.

According to an aspect of the present invention, an apparatus includes a light emitter that is fixed, an optical scanning probe that scans light generated from the light emitter over an object to be measured, and a processor that generates 3D data based on a scanning direction of the optical scanning probe and a distance between the optical scanning probe and the object to be measured. The optical path of the light may be changed by changing a scanning shape according to a shape of the object.

According to an aspect of the present invention, a method for generating three-dimensional (3D) data includes emitting light from a fixed light emitter over an object, and changing an optical path of the light by changing a scanning shape according to a shape of the object.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
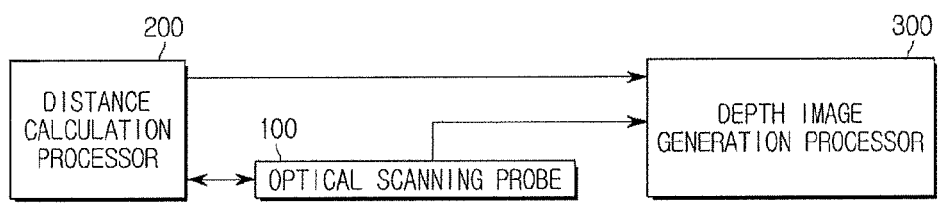
FIG. 1 illustrates an apparatus for generating three-dimensional (3D) data.

Reference will now be made in detail to the embodiments of the present invention, examples of which are illustrated in the accompanying drawings, wherein like reference numerals refer to like elements throughout. It should be noted that, in the specification, when reference numerals are used to mark elements of each of the drawings, the same reference numerals is used to mark the same elements, even though the elements are indicated in different drawings. In the description of the present invention, if it is determined that a detailed description of commonly-used technologies related to the invention may unnecessarily obscure the subject matter of the invention, the detailed description is omitted. While such terms as "first," "second," etc., may be used to describe various components, such components must not be limited to the above terms and may be used to distinguish one component from another.

Exemplary embodiments of the present invention are described in detail with reference to the attached drawings.

FIG. 1 illustrates an exemplary apparatus for generating three-dimensional (3D) data.

As illustrated in FIG. 1, the apparatus for generating 3D data may include an optical scanning probe 100, a distance calculation processor 200, and a depth image generation processor 300.

The optical scanning probe 100 may be configured to scan light generated from a light emitter over an object to be measured. The light may be stopped, and the optical scanning probe 100 that transmits the light, may be controlled so that precise position control may be performed on the object to be measured when the light is scanned and the amount of energy consumption can be reduced. A scanning type having various shapes may be applied to the optical scanning probe 100, for example, according to a region to be measured.

The light emitter may be a laser diode or an infrared (IR) light emitting diode (LED). However, the present invention is not limited thereto.

The object to be measured may refer to an object for obtaining a 3D image, and for example, when a device to which the apparatus for generating 3D data is applied, is a robot cleaning device, the object to be measured may be an obstacle in front of the apparatus for generating 3D data or an object to be cleaned.

The distance calculation processor 200 may be configured to calculate a distance between the optical scanning probe 100 and the object to be measured based on the light scanned over the object to be measured and light reflected from the object to be measured. The distance calculation processor 200 may calculate the distance between the optical scanning probe 100 and the object to be measured, by measuring a time of emitted light and a time of reflected and received light by applying a time of flight (TOF) distance calculation method. The calculated distance between the optical scanning probe 100 and the object to be measured may be used to generate a depth image that is 3D data.

The depth image generation processor 300 may be configured to generate 3D data based on a light scanning direction of the optical scanning probe 100 and the distance between the optical scanning probe 100 and the object to be measured.

An exemplary apparatus for generating 3D data may be configured to be applied to any object for which a 3D image is required. For example, the apparatus for generating 3D data may be applied to a robot cleaning device, a 3D television (TV), a notebook computer, or a car and may be used to recognize, for example, the obstacle in front of the apparatus for generating 3D data or a user's gesture.

A position in which the apparatus for generating 3D data is installed, at an object where the apparatus is to be applied, may be set according to an operator's need.

Figure 2:
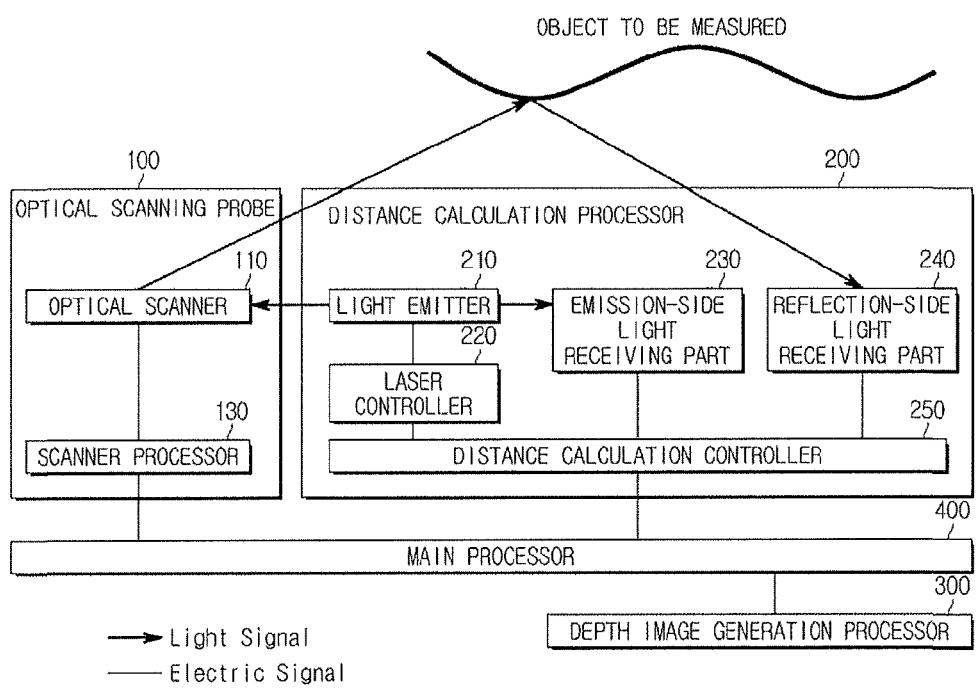
FIG. 2 illustrates an exemplary apparatus for generating 3D data illustrated in FIG. 1.

FIG. 2 is an exemplary control block diagram of the configuration of the apparatus for generating 3D data illustrated in FIG. 1.

Figure 3:
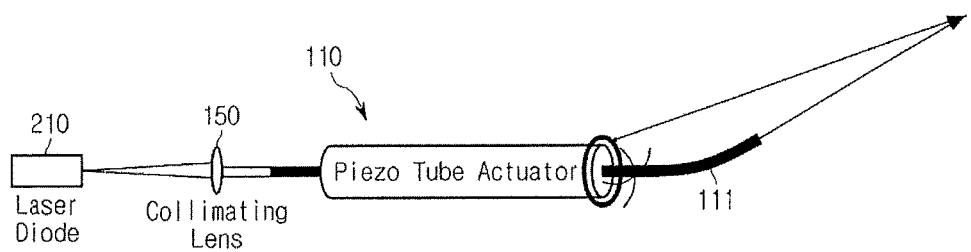
FIG. 3 illustrates an optical scanning probe in accordance with an embodiment of the present invention.
Figure 6:
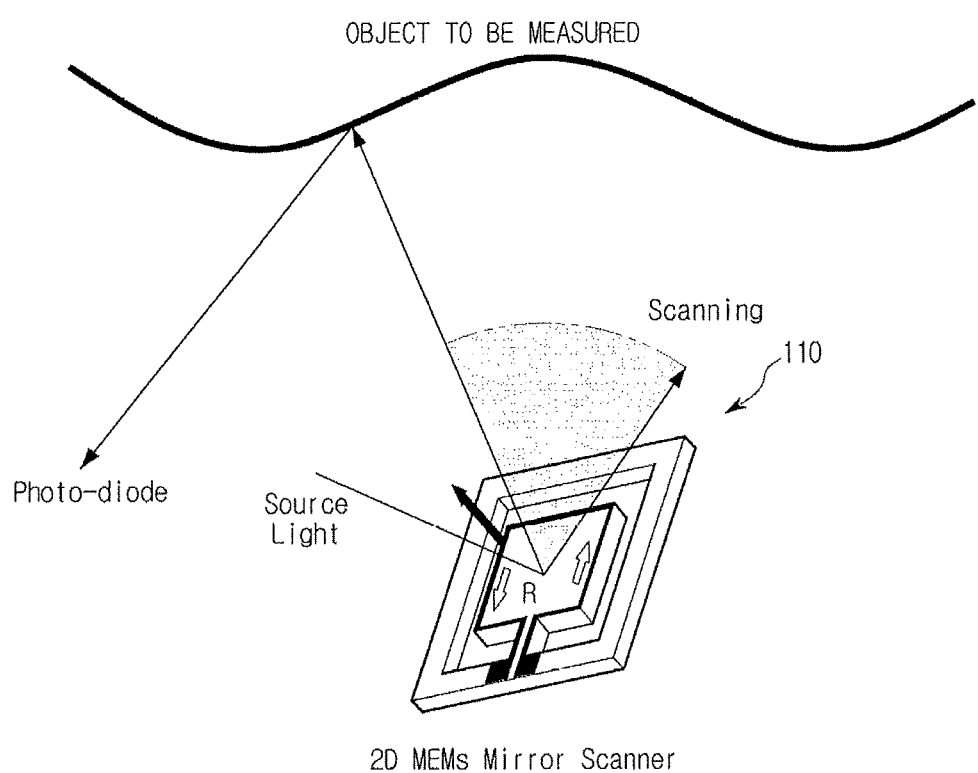
FIG. 6 illustrates an optical scanning probe in accordance with an embodiment of the present invention.
Figure 7A:
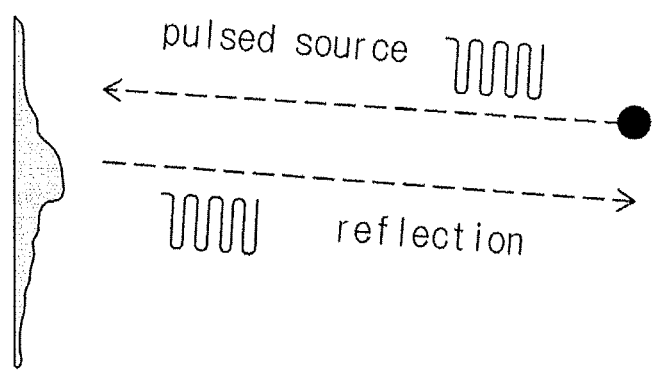
FIGS. 7A-7B illustrate exemplary operations of calculating a distance between an optical scanning probe and an object to be measured.
Figure 7B:
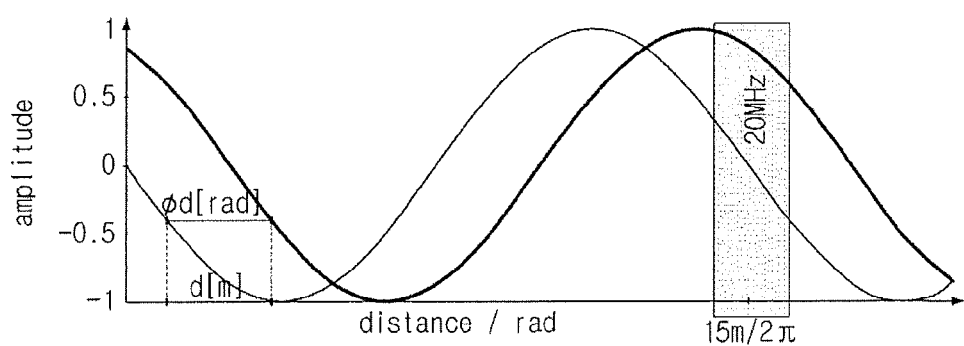
Figure 8:
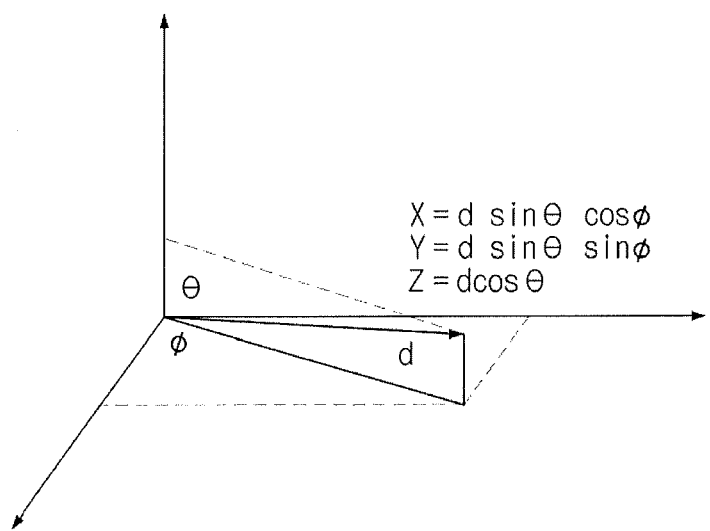
FIG. 8 illustrates an operation of generating 3D data in accordance with an embodiment of the present invention.
Figure 9A:
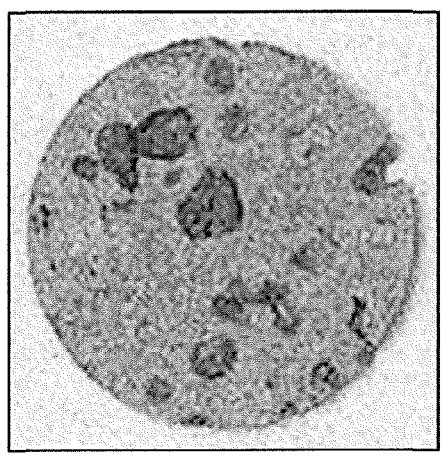
FIGS. 9A-9B illustrate an exemplary operation of removing noise from 3D data.
Figure 9B:

An exemplary configuration of the apparatus for generating 3D data is described with reference to FIG. 3 which is a view of an optical scanning probe in accordance with an embodiment of the present invention, FIG. 4 which is a view illustrating an exemplary operation of scanning and receiving light using the optical scanning probe illustrated in FIG. 3, FIGS. 5A-5C illustrating exemplary scanning types applied to the optical scanning probe of FIG. 3, FIG. 6 which is a view of an optical scanning probe in accordance with an embodiment of the present invention, FIGS. 7A-7B illustrating an exemplary operation of calculating a distance between the optical scanning probe and an object to be measured, FIG. 8 illustrating an operation of generating 3D data in accordance with an embodiment of the present invention, and FIGS. 9A-9B illustrating an exemplary operation of removing noise from 3D data.

As illustrated in FIG. 2, the apparatus for generating 3D data may include the optical scanning probe 100, the distance calculation processor 200, the depth image generation processor 300, and a main processor 400.

The optical scanning probe 100 may be configured to scan light generated from a light emitter 210 over an object to be measured, and may include an optical scanner 110 and a scanner processor 130.

The optical scanning probe 100 may include a collimating lens 150 that refracts the light generated from the light emitter 210 and transmits the refracted light to the optical scanner 110.

The optical scanner 110 may be configured to scan the light generated from the light emitter 210 over the object to be measured.

Figure 4:
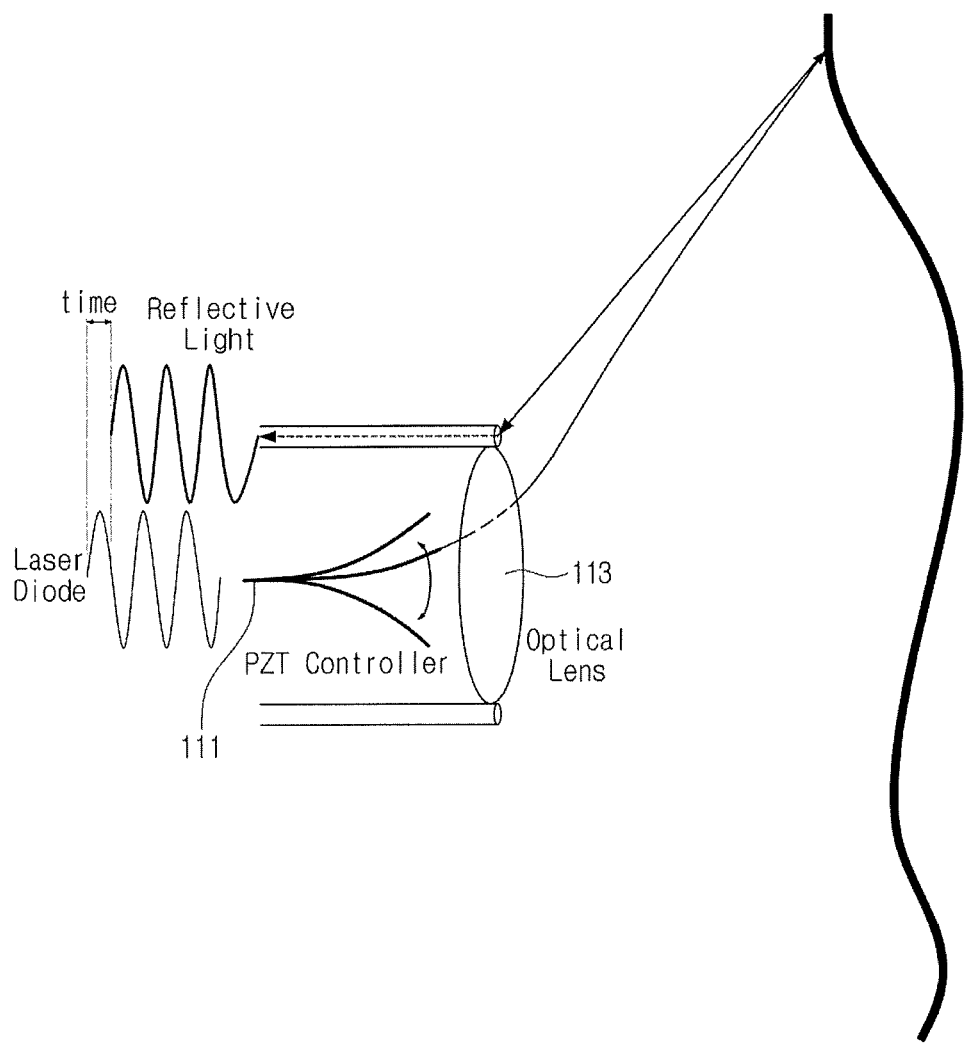
FIG. 4 illustrates an exemplary operation of scanning and receiving light using the optical scanning probe illustrated in FIG. 3.

Referring to FIGS. 3 and 4, the optical scanner 110 may include an optical probe 111 through which the light generated from the light emitter 210 passes, and an optical lens 113 that refracts the light that passes through the optical probe 111.

The scanner processor 130 may be configured to change an optical path of the optical scanner 110 and to change and control the scanning type according to the shape of the object to be measured. The scanner processor 130 may control the optical scanner 110 so that the scanning type may be changed according to a region of the object to be measured into which the light is scanned. Thus, precise position control may be performed while the light is scanned.

Figure 5A:
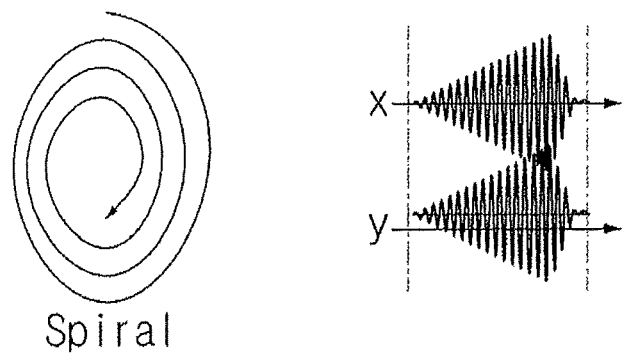
FIGS. 5A-5C illustrate exemplary scanning types applied to the optical scanning probe of FIG. 3.
Figure 5B:
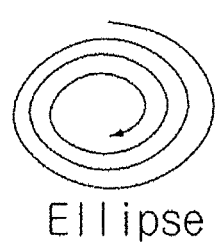
Figure 5B:
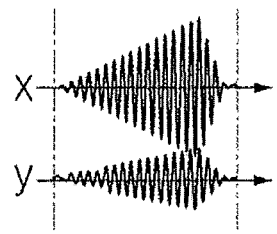
Figure 5C:
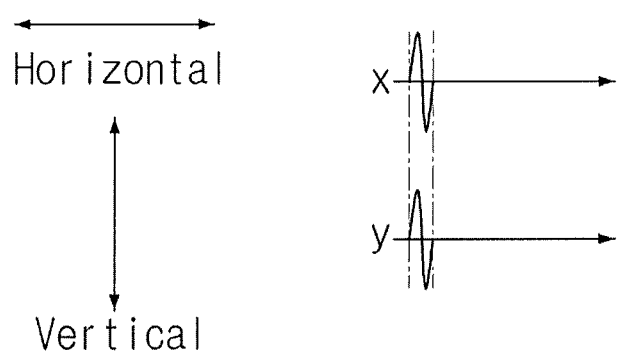

As illustrated in FIGS. 5A-5C, the scanning type may be one selected from the group consisting of a spiral type, an elliptical type, a horizontal type, a vertical type, a zigzag type, and a combination thereof.

A method of variably scanning only a desired region may be applied to the optical scanner 110 according to control of the scanner processor 130.

For example, when the scanning type is a spiral type and an elliptical type, waveforms of an X-coordinate reference and a Y-coordinate reference of scanning control signals may be as illustrated in FIG. 5A and FIG. 5B. When the scanning type is a horizontal type and a vertical type, waveforms of the X-coordinate reference and the Y-coordinate reference of the scanning control signals may be as illustrated in FIG. 5C.

The scanning type may be changed and applied to the scanner processor 130 according to various conditions, for example, such as projection or depression of a light scanning region.

The collimating lens 150 may be configured to be disposed between the light emitter 210 and the optical scanner 110 to refract the light generated from the light emitter 210, for example, at a predetermined angle and to allow the refracted light to be incident on the optical scanner 110.

As illustrated in FIG. 3, the optical scanner 110 may have a type of a piezo tube actuator that controls the optical probe 111 by driving a piezoelectric device.

Referring to FIG. 3, the optical scanner 110 having the piezo tube actuator may be formed to surround the optical probe 111 that serves as a path of light.

Although not shown, the piezo tube actuator may include a piezo device and a driving signal generation unit that generates driving signals for driving the piezo device.

As illustrated in FIG. 6, the optical scanning probe 100 may reflect the light generated from the light emitter 210 by applying, for example, a two-dimensional (2D) micro electro mechanical system (MEMS) scanner, to which an MEMS technology may be applied, as the optical scanner 110.

The scanner processor 130 changes the path of the light generated from the light emitter 210 by adjusting an angle of reflection of the 2D MEMS mirror scanner. That is, the scanner processor 130 changes the path of the light by adjusting an angle of a reflection surface R that the light contacts.

Since the optical scanner 110 to which the 2D MEMS mirror scanner is applied, changes the path of the light by adjusting the angle of reflection, unlike a piezo tube actuator type optical scanner 110, the optical probe 111 that serves a path of the light may be omitted.

The distance calculation processor 200 may be configured to calculate the distance between the optical scanning probe 100 and the object to be measured, based on the light scanned over the object to be measured and the reflected light.

As illustrated in FIG. 2, the distance calculation processor 200 may include the light emitter 210, a laser controller 220, an emission-side light receiving part 230, a reflection-side light receiving part 240, and a distance calculation controller 250.

The light emitter 210 may be configured to generate light scanned over the object to be measured and to transmit the light to the optical scanning probe 100.

The light emitter 210 may be a laser diode or an IR LED.

The laser controller 220 may be configured to control an operation of the light emitter 210.

The emission-side light receiving part 230 may be located adjacent to the light emitter 210 and may receive the light generated from the light emitter 210. That is, the emission-side light receiving part 230 may be configured to detect the light generated from the light emitter 210 and may be used to calculate a time difference between the light generated from the light emitter 210 and the reflected light when the distance between the optical scanning probe 100 and the object to be measured is calculated later. The emission-side light receiving part 230 may be implemented with a photodiode.

The reflection-side light receiving part 240 may receive light reflected from the object to be measured. That is, the reflection-side light receiving part 240 may receive light reflected after being scanned over the object to be measured and may receive light having a shape illustrated in FIG. 4. The reflection-side light receiving part 240 may be implemented with a photodiode.

The distance calculation controller 250 may calculate a distance between the optical scanning probe 100 and the object to be measured, for example, by calculating a time difference between light received by the emission-side light receiving part 230 and light received by the reflection-side light receiving part 240.

Referring to FIGS. 7A-7B, the distance calculation controller 250 may calculate a distance d (see, for example, FIG. 7B) between the optical scanning probe 100 and the object to be measured, using, for example, Equation 1 that calculates a phase difference between emitted light (pulsed source) and received light (reflection) (see, for example, FIG. 7A)

$$d = \frac{c}{f_{mod}} \times \frac{1}{2} \times \frac{\phi_d}{2\pi}$$ [Equation 1]

wherein d is a distance between the optical scanning probe 100 and the object to be measured, and c is the speed of light.

The depth image generation processor 300 may be configured to generate 3D data based on the light scanning direction of the optical scanning probe 100 and the distance between the optical scanning probe 100 and the object to be measured.

The depth image generation processor 300 may generate 3D data by restoring 3D coordinates based on a direction in which the light is scanned over the object to be measured (light scanning angle) transmitted from the optical scanning probe 100 and the distance between the optical scanning probe 100 and the object to be measured transmitted from the distance calculation processor 200.

As illustrated in FIG. 8, the depth image generation processor 300 may use the light scanning direction and the distance between the optical scanning probe 100 and the object to be measured, so as to generate 3D data. The light scanning direction may be restored to 3D coordinates of X, Y, and Z, for example, with respect to (θ, φ) based on Equations 2 through 4

$X = d \sin θ \cos φ$ [Equation 2]

$Y = d \sin θ \sin φ$ [Equation 3]

$Z = d \cos θ$, [Equation 4]

wherein θ and φ are light scanning angles of an optical probe, and d is a distance between the optical scanning probe 100 and the object to be measured, and X, Y, and Z are an X-coordinate, a Y-coordinate, and a Z-coordinate in 3D data, respectively.

The depth image generation processor 300 may obtain one piece of depth information, using for example the above-described procedure, and may generate 3D data by checking pieces of depth information according to each pixel by repeatedly performing an operation of obtaining one piece of depth information.

That is, the depth image generation processor 300 generates 3D data by performing 3D coordinate restoration on each of a plurality of pixels.

As illustrated in a comparison of FIG. 9A and FIG. 9B, the depth image generation processor 300 may remove noise from the 3D data, for example, using a predetermined method.

For example, noise may be removed from the 3D data generated using scanned data using a median filter or a Gaussian filter. However, the present invention is not limited thereto. The median filter illustrated in FIGS. 9A-9B may be a technology for removing signal noise from an image or other signals using nonlinear digital filter technology, may be required to remove high-performance noise from the image that is a previous operation for performing high-level processing, such as contour detection, in image processing. The median filter may be useful for reducing, for example, speckle noise or small spots.

Figure 10:
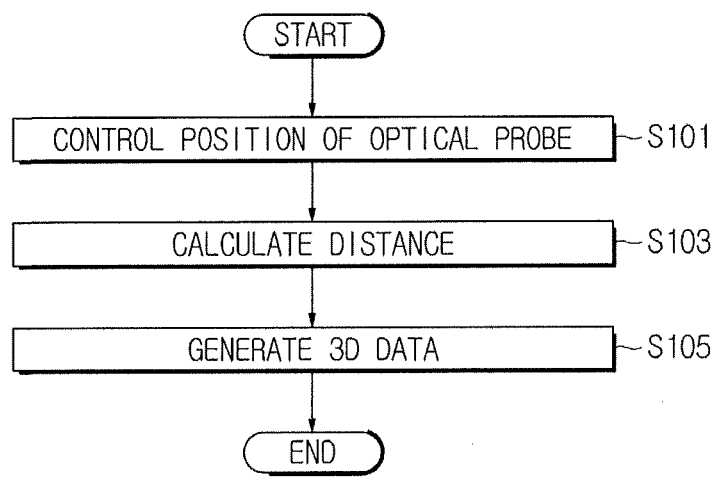
FIG. 10 illustrates a method of generating 3D data in accordance with an embodiment of the present invention.

FIG. 10 is a flowchart illustrating a method of generating 3D data in accordance with an embodiment of the present invention.

The optical scanning probe 100 of the apparatus for generating 3D data may scan light generated from the light emitter 210 over an object to be measured (S101), The light emitter 210 may be a laser diode or an IR LED. However, the present invention is not limited thereto.

The optical scanning probe 100 includes an optical scanner 110 and a scanner processor 130. The optical scanner 110 may change an optical path by adjusting a scanning type according to the shape of the object to be measured, when light generated from the light emitter 210 is scanned over the object to be measured according to control of the scanner processor 130.

As illustrated in FIGS. 5A-5C, the scanning type may be one among a spiral type, an elliptical type, a horizontal type, a vertical type, a zigzag type, and a combination thereof. A method of variably scanning only a desired region may be applied to the optical scanner 110 according to control of the scanner processor 130.

For example, when the scanning type is a spiral type and an elliptical type, waveforms of an X-coordinate reference and a Y-coordinate reference of scanning control signals may be as illustrated in FIGS. 5A and 5B. When the scanning type is a horizontal type and a vertical type, waveforms of the X-coordinate reference and the Y-coordinate reference of the scanning control signals may be as illustrated in FIG. 5C.

The scanning type may be changed and applied to the scanner processor 130 according to various conditions, such as projection or depression of a light scanning region. Thus, a light scanning position on the object to be measured can be precisely controlled so that 3D data having good quality can be obtained.

The distance calculation processor 200 may calculate a distance between the optical scanning probe 100 and the object to be measured based on light scanned over the object to be measured and reflected light (S103).

The distance calculation processor 200 includes a light emitter 210, a laser controller 220, an emission-side light receiving part 230, a reflection-side light receiving part 240, and a distance calculation controller 250 and may calculate a time difference (time as illustrated in FIG. 4) between light received by the emission-side light receiving part 230 and light received by the reflection-side light receiving part 240.

The emission-side light receiving part 230 may be located adjacent to the light emitter 210 and may receive the light generated from the light emitter 210. That is, the emission-side light receiving part 230 may be configured to detect the light generated from the light emitter 210 and may be used to calculate a time difference between the light generated from the light emitter 210 and the reflected light when the distance between the optical scanning probe 100 and the object to be measured is calculated later. The emission-side light receiving part 230 may be implemented with a photodiode.

The reflection-side light receiving part 240 may receive light reflected from the object to be measured. That is, the reflection-side light receiving part 240 may receive light reflected after being scanned over the object to be measured and may receive light having a shape, for example, illustrated in FIG. 4. The reflection-side light receiving part 240 may be implemented with a photodiode.

The depth image generation processor 300 may generate 3D data based on a scanning direction of the optical scanning probe 100 and the distance between the optical scanning probe 100 and the object to be measured (S105). The optical scanning probe 100 and the distance calculation processor 200 may provide the scanning direction of the optical scanning probe 100 and the distance between the optical scanning probe 100 and the object to be measured, respectively, to the depth image generation processor 300.

The depth image generation processor 300 may obtain one piece of depth information based on the scanning direction of the optical scanning probe 100 and the distance between the optical scanning probe 100 and the object to be measured and may generate 3D data by checking pieces of depth information according to each pixel by repeatedly performing an operation of obtaining one piece of depth information.

The depth image generation processor 300 may obtain 3D data having good quality by performing noise filtering (see FIG. 9) on the 3D data.

As described above, according to an exemplary embodiment of the disclosed invention, a light emitter is fixed, and only an optical path is changed in various scanning shapes so that a distance between an optical scanning probe and an object to be measured can be calculated, and light is projected onto one point and thus a signal to noise ratio (SNR) is good so that, even though brightness of emitted light is relatively weak, precise 3D data can be obtained.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for generating three-dimensional (3D) data, the apparatus comprising:
    an optical scanning probe that scans light generated from a fixed light emitter over an object to be measured;
    at least one memory storing instructions;
    a distance calculation processor including:
        the fixed light emitter to generate light to be scanned over the object to be measured and including a lens to transmit the light to the optical scanning probe,
        an emission-side light receiving part and a reflection-side receiving part, and
        at least one hardware processor to execute the instructions stored in the at least one memory to calculate a distance between the optical scanning probe and the object to be measured based on the light scanned over the object to be measured and a light reflected from the object to be measured by calculating a time difference between a light received by the emission-side light receiving part and a light received by the reflection-side light receiving part; and
    a depth image generation processor at least one hardware processor to execute the instructions stored in the at least one memory to:
        generate 3D data based on a scanning direction of the optical scanning probe and the distance between the optical scanning probe and the object to be measured, and
        remove noise from the generated 3D data using a nonlinear median filter.

2. The apparatus of claim 1, wherein
    the emission-side light receiving part located adjacent to the fixed light emitter and receives the light generated from the fixed light emitter.

3. The apparatus of claim 1, wherein the depth image generation processor executes the instructions stored in the at least one memory to generate 3D data by restoring 3D coordinates based on information on a direction in which the light scanned over the object to be measured is transmitted from the optical scanning probe and the distance between the optical scanning probe and the object to be measured transmitted from the distance calculation processor.

4. The apparatus of claim 3, wherein the depth image generation processor executes the instructions stored in the at least one memory to generate the 3D data by performing 3D coordinate restoration on each of a plurality of pixels.

5. The apparatus of claim 1, wherein the fixed light emitter is a laser diode or an infrared (IR) light emitting diode (LED).

6. An apparatus for generating three-dimensional (3D) data, the apparatus comprising:
    a light emitter that is fixed and including a lens;
    an optical scanning probe that scans light generated from the fixed light emitter through the lens over an object to be measured;
    an emission-side light receiving part and a reflection-side receiving part;
    at least one memory storing instructions; and
    at least one hardware processor to execute the instructions stored in the at least one memory to:
        calculate a distance between the optical scanning probe and the object to be measured based on the light scanned over the object to be measured and a light reflected from the object to be measured by calculating a time difference between a light received by the emission-side light receiving part and a light received by the reflection-side light receiving part,
        generate 3D data based on a scanning direction of the optical scanning probe and the calculated distance between the optical scanning probe and the object to be measured, and
        remove noise from the generated 3D data using a nonlinear median filter.

* * * * *